United States Patent [19]

Haynes et al.

[11] Patent Number: 5,339,893
[45] Date of Patent: Aug. 23, 1994

[54] APPARATUS FOR CONTAINING TOXIC SPILLS EMPLOYING HYBRID THERMOSYPHONS

[75] Inventors: Francis D. Haynes, Etna, N.H.; John P. Zarling, Fairbanks, Ak.; William F. Quinn, Hanover, N.H.

[73] Assignee: The United States of America as represented by the Secretary of the Army, Washington, D.C.

[21] Appl. No.: 880,262

[22] Filed: May 8, 1992

[51] Int. Cl.$^5$ .................................. E02D 19/14
[52] U.S. Cl. ........................ 165/45; 62/260; 62/DIG. 22; 165/912; 405/130
[58] Field of Search ........... 165/45, 104.21, 912; 62/260, 45.1, DIG. 22; 405/130

[56] References Cited

U.S. PATENT DOCUMENTS

| | | | |
|---|---|---|---|
| 3,749,163 | 7/1973 | Waters | 165/45 |
| 3,976,125 | 8/1976 | Best | 165/45 |
| 4,793,146 | 12/1988 | Ryokai | 165/45 |
| 4,961,463 | 10/1990 | Denhartog et al. | 165/45 |
| 4,974,425 | 12/1990 | Krieg et al. | 62/45.1 |

OTHER PUBLICATIONS

*Cold Regions Science and Technology*, 15 (1988) pp. 251–259, F. Haynes et al., "Thermosyphons & Foundation Design in Cold Regions".

*The Seattle Times*, Aug. 28, 1991, H. Williams, "Scientists Study a Deep Freeze for Leaking Wastes".

*Cold Regions Science and Technology*, 15 (1988) pp. 319–321, S. DenHartog, "A Thermosyphon for Horizontal Applications".

Primary Examiner—Albert W. Davis, Jr.
Attorney, Agent, or Firm—Luther A. Marsh

[57] ABSTRACT

The present invention is directed to a hybrid thermosyphon which may be rapidly deployed to create a frozen soil barrier for containing toxic spills. In a particular embodiment, a plurality of thermosyphons are deployed for freezing the soil around and under a defined area of soil; each thermosyphon contains a working fluid and includes an evaporator section for contact with the soil for removing heat therefrom by evaporation of the working fluid. A condenser section in flow communication with evaporator section and remote from the soil transfers heat from the working fluid to ambient by heat exchange and subsequent condensation of the working fluid when the ambient is lower than the temperature of the soil. An active refrigeration stage in heat exchange relation with at least a portion of the condenser section removes heat from the working fluid by heat exchange when the ambient is above the soil temperature. Sensors may be provided for sensing the ambient temperature for selectively operating the active refrigeration stage.

2 Claims, 3 Drawing Sheets

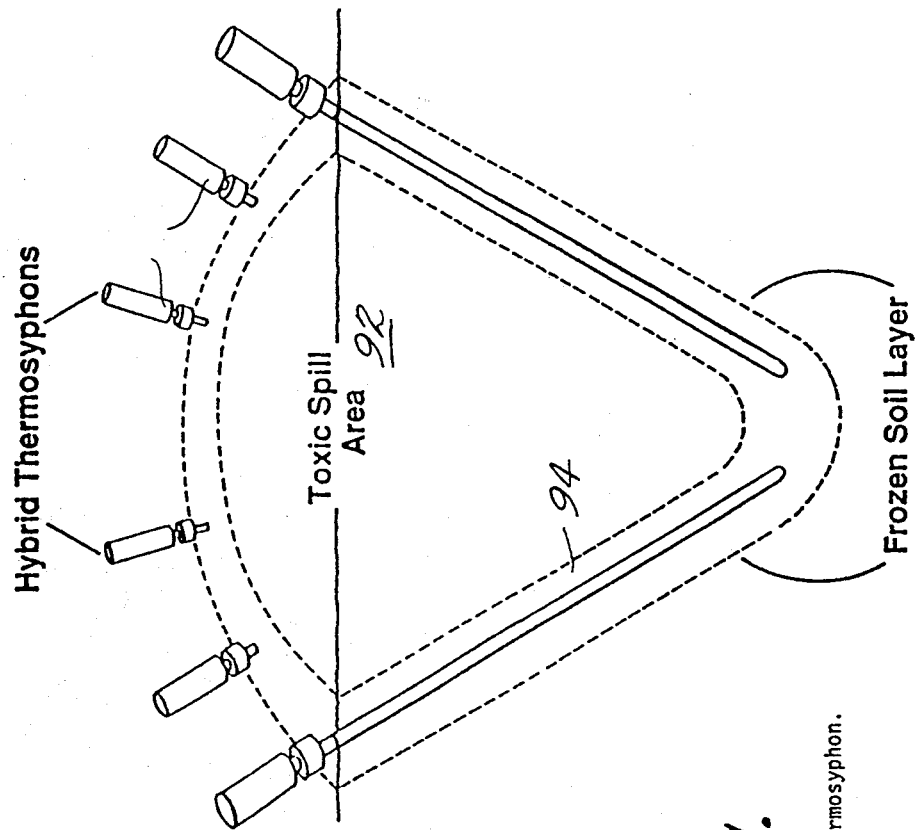
Fig. 4. Thermosyphons installed in an inclined circular pattern to contain a toxic spill.
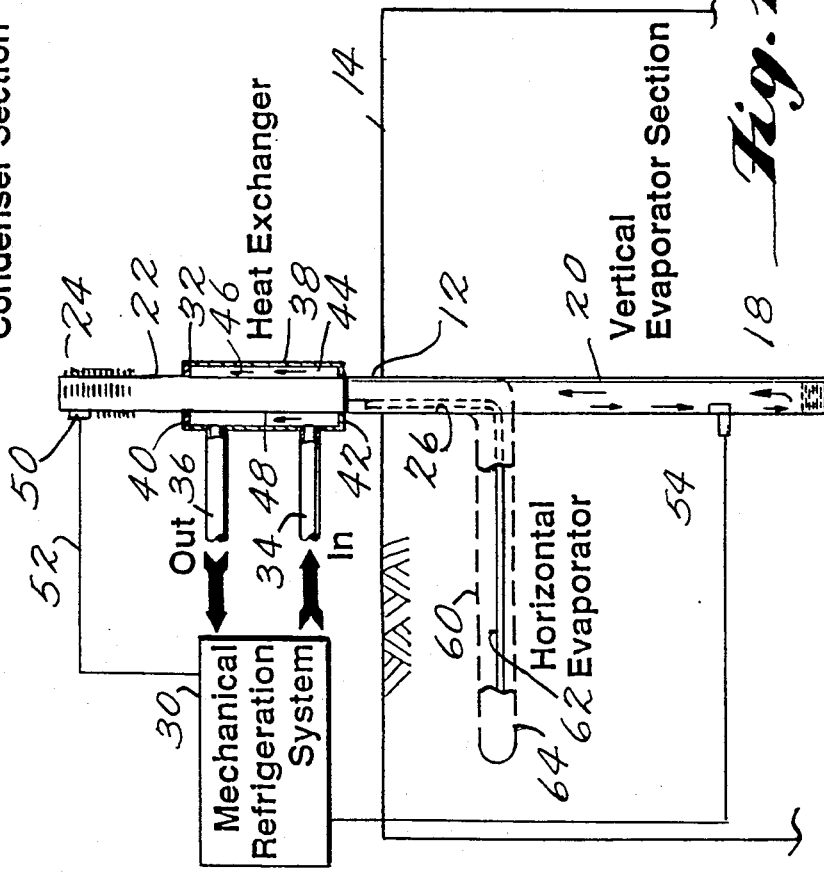
Fig. 1. A passive-active hybrid thermosyphon.
HYBRID THERMOSYPHON Thermosyphons with horizontal evaporators installed under a toxic spill.

Thermosyphons installed at an angle under a toxic spill area.

APPARATUS FOR CONTAINING TOXIC SPILLS EMPLOYING HYBRID THERMOSYPHONS

FIELD OF THE INVENTION

The invention relates to an apparatus for producing a frozen soil barrier to contain a toxic spill. In particular, the invention relates to a hybrid thermosyphon operative in either a passive or active mode and means for sensing the ambient for switching the thermosyphon between such modes.

BACKGROUND OF THE INVENTION

Throughout the nation and the world there have been numerous toxic spills. Many of these have caused serious problems for communities and ecosystems. In particular, some of the spills have resulted in contaminants seeping into the ground water and then into streams, rivers and lakes. Such ground water contamination has a far reaching adverse effects on humans as well as wild life and vegetation.

In order to limit environmental damage, there is usually an urgent need to contain the spill and limit its migration as quickly as possible. One proposed solution for limiting toxic spill containment is suggested in an article dated Aug. 28, 1991 in the Seattle Times in which an elaborate and massive refrigeration system was proposed for immobilizing leaking nuclear waste at the Hanford nuclear site. The arrangement provides for a peripheral ice wall and requires peripheral refrigeration pipes which encircle the site. The arrangement disclosed, while suggesting feasibility of freezing toxic wastes, has many practical and economic limitations.

Heat exchange devices known as thermosyphons have been used for removal of heat from permafrost foundations over which buildings, roads and other structures have been built. The manmade structures alter the surface temperature of the permafrost foundation and can cause thawing of large areas with subsequent subsidence. This inevitable subsidence removes support from the foundation and results in destruction of the building or roadway. A device for alleviating permafrost subsidence is disclosed in DenHartog et al., U.S. Pat. No. 4,961,463. The arrangement employs a passive thermosyphon which has a condensate return. A related article in *Cold Region Science and Technology*, 15 (1988) discusses the condensate return which is especially useful in horizontal thermosyphon applications. See also Haynes et al., *Cold Region Science and Technology*, 15 (1988) for a general discussion of foundation designs utilizing thermosyphons.

The arrangements discussed and the various references relate to passive systems employed in cold regions in which maintenance of the permafrost condition is required.

SUMMARY OF THE INVENTION

The present invention is directed to a thermosyphon or hybrid thermosyphon which may be rapidly deployed to create a frozen soil barrier for containing toxic spills. In a particular embodiment, the apparatus of the present invention comprises a plurality of thermosyphons for freezing the soil around and under a defined area of soil; each thermosyphon contains a working fluid and includes an evaporator section for contact with the soil for removing heat therefrom by evaporation of the working fluid. A condenser section in flow communication with an evaporator section and remote from the soil transfers heat from the working fluid to ambient by heat exchange and subsequent condensation of the working fluid when the ambient is lower than the temperature of the soil. An active refrigeration stage in heat exchange relation with at least a portion of the condenser section removes heat from the working fluid by heat exchange when the ambient is above the soil temperature. Means may be provided for sensing the ambient and soil temperatures for selectively operating the active refrigeration stage.

A number of techniques are illustrated for containing toxic spills in various terrains.

BRIEF DESCRIPTION OF THE DRAWINGS

FIG. 1, 1A is a partially fragmented schematic diagram of a hybrid thermosyphon according to the present invention with an alternative embodiment shown in phantom view;

FIG. 4 illustrates yet another embodiment of the invention in a conical array.

DESCRIPTION OF THE PREFERRED EMBODIMENTS

Figure 1A:
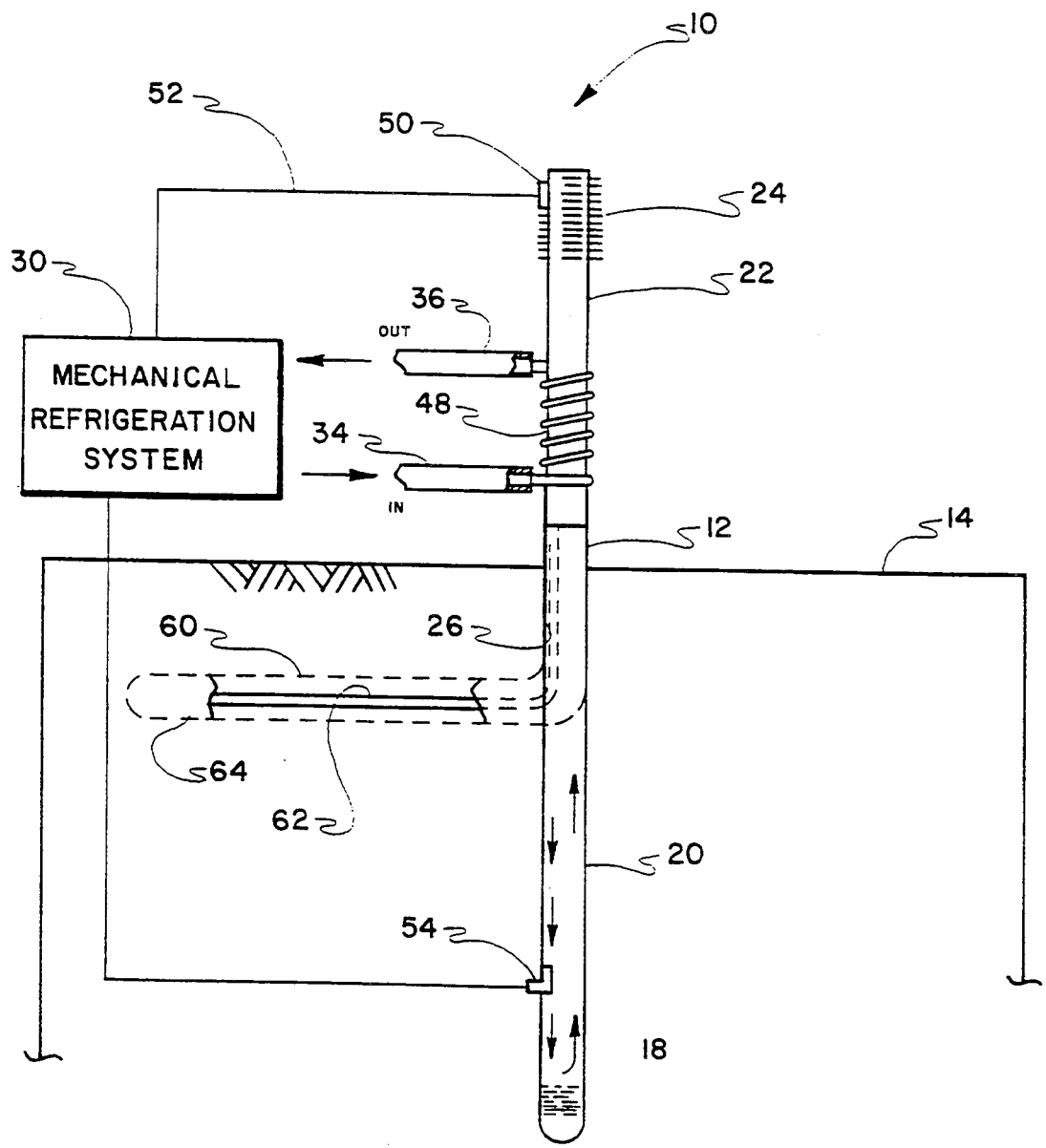

FIG. 1 illustrates a schematic diagram of a hybrid thermosyphon 10 in accordance with the present invention. In the embodiment, the thermosyphon 10 comprises an elongated refrigeration pipe 12 which is shown imbedded vertically below the surface 14 of a soil sample 16. The pipe 12 is enclosed and contains a circulating working fluid 18. The thermosyphon 10 has an evaporator section 20 for contacting the soil 16 and a condenser section 22 in flow communication therewith which is located above the ground surface layer 14 and which is exposed to ambient. The condenser section 22 includes a finned portion 24 which is in heat exchange relationship with the ambient air and which enhances heat exchange with the working fluid 18 within the pipe 12. In operation, the working fluid 18 removes heat from the soil 16 by evaporation, the vapors of which move upwardly in the pipe 12 to the condenser section 24 where condensation takes place whereby the working fluid 18 flows downwardly against interior walls 26 of the pipe thereby completing a closed refrigeration cycle.

The cycle proceeds as long as the temperature of the ambient air above the ground surface layer 14 is cooler than the soil temperature. Toxic spills may occur in any environment. Thus, in accordance with the invention a supplementary refrigeration means in the form of a mechanical refrigeration system 30 is provided for removing heat from the soil 16 during those times when the ambient air is warm. The mechanical refrigeration system 30 is coupled to the thermosyphon 10 by means of a heat exchanger 32 and interconnecting inlet and outlet lines 34 and 36. The heat exchanger 32 comprises an annular shell 38 surrounding the pipe 12 and upper and lower annular closures 40 and 42 which form an annular chamber 44 between the inner refrigeration pipe 12 and outer heat exchanger pipe 38. The mechanical refrigeration system 30 provides a working fluid 46 which cools the section 48 of the pipe 12 between the upper and lower closures 40 and 42. In this way, working fluid 18 evaporated in the evaporation section 20 is condensed in the condenser section 48 to thereby enable continuous operation of the refrigeration cycle.

As shown in FIG. 1A, it is also contemplated that the mechanical refrigeration system 30 may be coupled to the pipe 12 by installing a heat exchanger in the form of a coil, 33, externally or internally of pipe 12. An external coil would be relatively easy to install and would require little or no field welding.

Sensor means 50 may be provided in heat exchange relationship with the finned portion 24 for providing an enabling signal on line 52 to the mechanical refrigeration system 30 when the temperature of the condenser section 22 drops below some selected temperature. Alternatively, heat sensor 54 may be provided in the evaporator section 20 for detecting the temperature thereof such that when the temperature of the condenser section 24 exceeds the temperature of the evaporator section 20, the mechanical refrigeration system 30 is enabled.

In FIG. 1, an alternative embodiment is illustrated by the phantom lines representing an arrangement in which horizontal evaporator portion 60 is provided. In the arrangement illustrated, the horizontal evaporator portion 60 is coupled into flow communication with the condenser section 22. The only difference is that the horizontal evaporator portion 60 may be employed to remove heat closer to the surface 14 and over a wider surface area. In the alternative arrangement illustrated, a condensate return pipe 62 may be provided for directing condensate from the condenser section 22 to near the distal end 64 of the horizontal evaporator portion 60. Reference is directed to DenHartog et al., U.S. Pat. No. 4,961,463 for the details of a useful condensate return, the teachings of which are incorporated herein.

Figure 2:
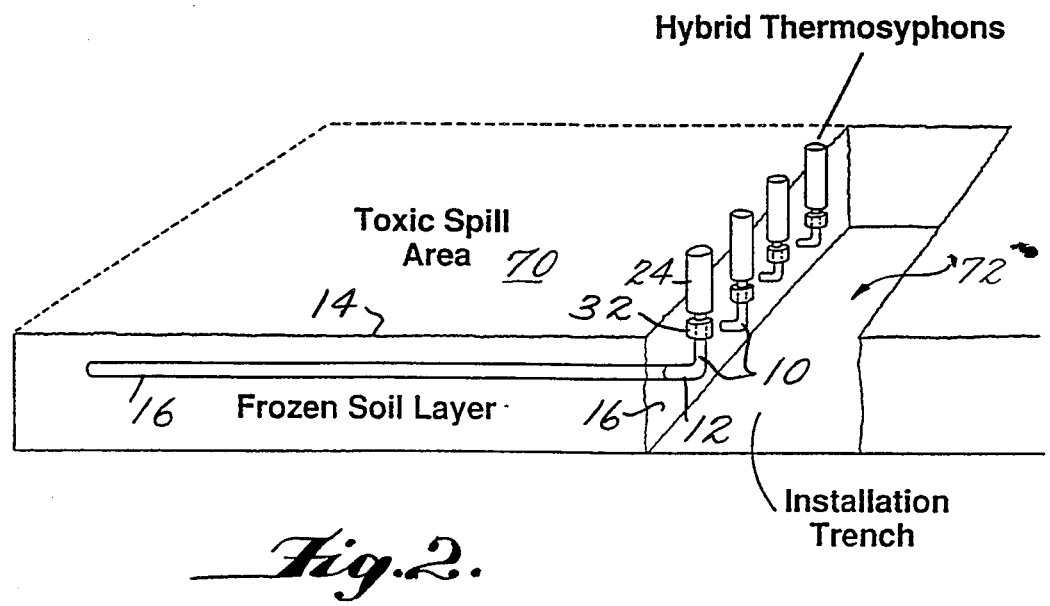
FIG. 2 illustrates the installation of a plurality of hybrid thermosyphons in a horizontal array.

FIG. 2 illustrates installation of a plurality of hybrid thermosyphons 10 in accordance with the alternative embodiment of the present invention. In the arrangement, a toxic spill area 70 may be frozen by means of a plurality of thermosyphons 10 each having a horizontal evaporator section 60 and a finned condenser 22 and heat exchanger 32 coupled to a mechanical refrigeration system not illustrated in FIG. 2. The thermosyphons 10 may be installed below the surface 14 of the soil 16 by means of an installation trench 72 as illustrated. The pipes 12 forming the main body of the thermosyphons may be installed in sections and welded in place.

Figure 3:
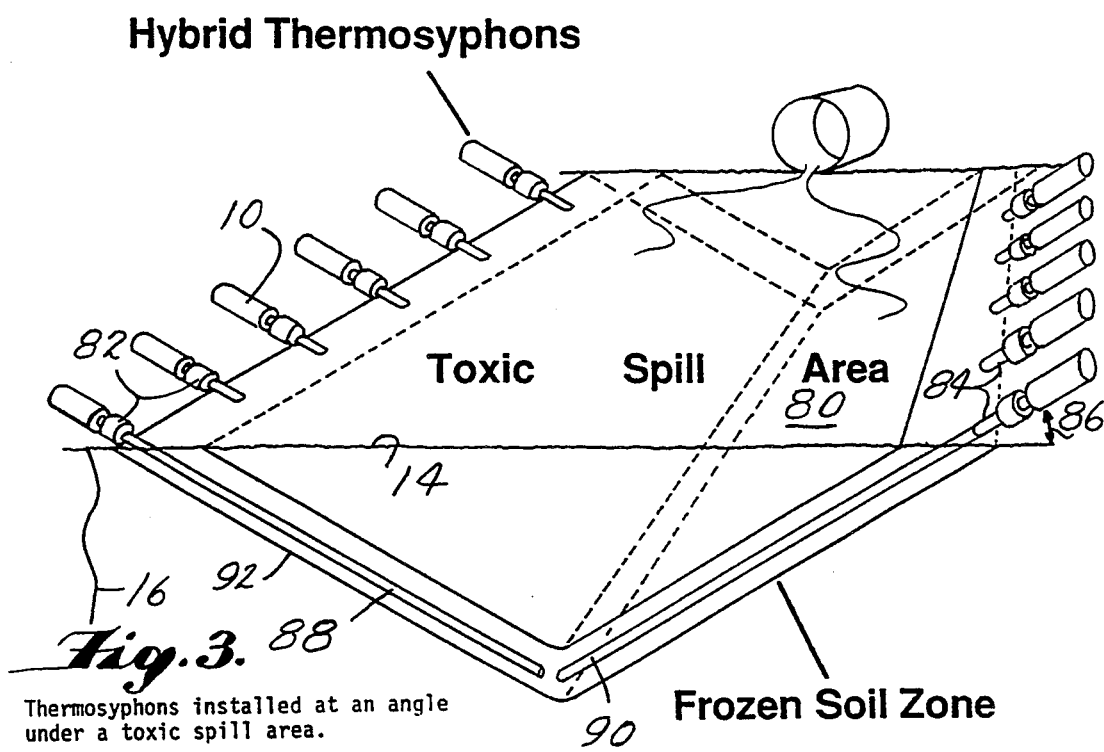
FIG. 3 illustrates an array of hybrid thermosyphons in a trough arrangement.

In an alternative embodiment of the invention illustrated in FIG. 3, the toxic spill area 80 is immobilized by means of a plurality of hybrid thermosyphons 10 which are arranged side-by-side in opposing sets 82 and 84. The opposing sets are disposed at an angle 86 with respect to the soil surface 14 and extend into the soil 16 so that their respective distal ends 88 and 90 are proximate each other. In this way, a trench like frozen zone 92 of soil 16 may be formed under the toxic spill area 80.

In yet another embodiment of the invention illustrated in FIG. 4, a plurality of hybrid thermosyphons 10 may be arranged in a circle at an angle for surrounding a toxic spill area 92. In this arrangement, the thermosyphons 10 form a conical zone 94 which forms a conical frozen soil barrier under the toxic spill.

In each of the embodiments illustrated, the working fluid 18 is preferably any one of a plurality of appropriate non-toxic materials capable of assuming gas and liquid phases including alcohols, carbon dioxide or ammonia. Failure of the thermosyphons or the refrigeration system will then not add to the toxic spill problem.

The advantages of the present invention include the ability to prevent migration of toxic materials to adjacent reservoirs or sources of ground water during any tithe of the year. The system may be rapidly deployed by simply drilling holes in the soil at spaced locations about the toxic spill and inserting the thermosyphon in each ground hole. Field welding and refrigerant charging may be accomplished at the same time. The thermosyphons provide a very flexible solution to the toxic spill problem because they may be arranged in any pattern in accordance with the particular spill geometry and soil conditions. The refrigerants contemplated in the present invention are non-toxic themselves and thus, if any of the thermosyphons fail, the working fluid will simply vent to atmosphere thereby eliminating an additional source of contamination. During those times of the day or during the various seasons of the year when the ambient temperature is lower than the ground temperature the hybrid thermosyphons of the present invention operate without additional power input. During those periods when supplemental refrigeration is necessary, a portable refrigeration unit may be employed to operate one or more of the thermosyphons. Such an apparatus may be operated by a solar source, for example a photovoltaic solar panel. For a further discussion of the advantages of the invention and exemplary data, see Haynes et al., "Laboratory Tests with a Hybrid Thermosyphon", 1991 OMAE, vol. IV, Arctic/Polar Technology ASME 1991, the teachings of which are incorporated herein by reference.

While there have been described what are considered to be the preferred embodiments of the present invention, it will be apparent to those skilled in the art that various changes may be made therein without departing from the invention and it is intended in the claims to cover such changes and modifications as fall within the true spirit and scope of the invention.

What is claimed:

1. Apparatus for containing a toxic spill on the soil within a defined area comprising a plurality of thermosyphons for freezing the soil around and under the defined area, each of said thermosyphons containing a working fluid in a closed refrigeration cycle, each thermosyphon comprising a closed pipe for containing the working fluid having an evaporator section for contact with the soil for removing heat therefrom by evaporation of the working fluid and a passive condenser section in flow communication with the evaporator section remote from the soil for transferring heat from the working fluid to ambient by heat exchange and consequent condensation thereof when the ambient temperature is below the temperature of the soil;

and an active refrigerant stage in heat exchange relation with at least a portion of the condenser section for removing heat from the working fluid by heat exchange therewith when the temperature of the condenser section is above the temperature of the soil;

wherein the condenser section comprises at least a plurality of finned heat exchange surfaces attached to a portion of the pipe above the ground surface layer;

wherein the active refrigeration section comprises a coil in heat exchange relation with a portion of said condenser section.

2. Apparatus for containing a toxic spill on the soil within a defined area comprising a plurality of thermosyphons for freezing the soil around and under the defined area, each of said thermosyphons containing a working fluid in a closed refrigeration cycle, each thermosyphon comprising a closed pipe for containing the working fluid having an evaporator section for contact with the soil for removing heat therefrom by evaporation of the working fluid and a passive condenser section in flow communication with the evaporator section remote from the soil for transferring heat from the working fluid to ambient by heat exchange and consequent condensation thereof when the ambient temperature is below the temperature of the soil;

and an active refrigerant stage in heat exchange relation with at least a portion of the condenser section for removing heat from the working fluid by heat exchange therewith when the temperature of the condenser section is above the temperature of the soil;

further including sensor means responsively coupled to the refrigeration stage for sensing the ambient temperature and providing a signal for enabling the refrigeration stage when the ambient is above a selected temperature;

wherein said sensor means is responsively coupled to the evaporation and condenser section sections for sensing the temperature difference between the evaporator section and condenser section to sense when the temperature of the condenser section exceeds the temperature of the evaporator section by a selected amount.

* * * * *